(12) United States Patent
D'Ercoli et al.

(10) Patent No.: US 10,762,318 B2
(45) Date of Patent: Sep. 1, 2020

(54) LIGHT PROJECTED FEEDBACK FOR GUIDING HAND MOVEMENTS

(71) Applicant: Datalogic IP Tech S.r.l., Lippo di Calderara di Reno (IT)

(72) Inventors: Francesco D'Ercoli, Bologna (IT); Vittorio Rago, San Giovanni in Persiceto (IT); Mattia Mantovani, Lendinara (IT)

(73) Assignee: Datalogic IP Tech S.r.l. (IT)

( * ) Notice: Subject to any disclaimer, the term of this patent is extended or adjusted under 35 U.S.C. 154(b) by 0 days.

(21) Appl. No.: 16/231,725

(22) Filed: Dec. 24, 2018

(65) Prior Publication Data
US 2020/0202094 A1 Jun. 25, 2020

(51) Int. Cl.
*G06K 7/14* (2006.01)
*G06K 7/10* (2006.01)

(52) U.S. Cl.
CPC ....... *G06K 7/1456* (2013.01); *G06K 7/10821* (2013.01); *G06K 7/146* (2013.01); *G06K 2007/10524* (2013.01)

(58) Field of Classification Search
None
See application file for complete search history.

(56) References Cited

U.S. PATENT DOCUMENTS 7,325,737 B2 * 2/2008 Epshteyn ........... G06K 7/10712
235/462.01
9,361,496 B2 * 6/2016 Handshaw ......... G06K 7/10881

OTHER PUBLICATIONS

International Patent Application No. PCT/US18/66327, as filed Dec. 18, 2018.

* cited by examiner

*Primary Examiner* — Kristy A Haupt
(74) *Attorney, Agent, or Firm* — Shook, Hardy & Bacon L.L.P.

(57) ABSTRACT

A hand-held barcode reader has a decoding module that analyzes barcodes on a surface. The decoding module determines a displacement based on a current position of the hand-held barcode reader and a desired new position of the hand-held barcode reader with respect to a barcode on the surface. An LED of the hand-held barcode reader produces a first-colored light-spot at a position on the surface to direct a desired movement of the hand-held barcode reader to move from the current position to the desired new position.

20 Claims, 7 Drawing Sheets

FIG. 5C

LIGHT PROJECTED FEEDBACK FOR GUIDING HAND MOVEMENTS

CROSS-REFERENCE TO RELATED APPLICATIONS

None.

BACKGROUND

Traditional means of scanning a barcode provide a minimal amount of information to a user regarding a detected barcode. Traditional means may provide a notification when a barcode is successfully scanned. This notification is often provided using a noise, which can indicate a successful scan of a barcode but provides little other information to a user about the barcode. For instance, if the barcode is not scanning, a user does not know the reason why the scanner has failed to read the barcode. As such, traditional means provide a limited set of information to a user.

Further, using a noise as a notification can be an intrusive interrupt to a user. As the noise is provided using beepers, buzzers, and other distracting notification techniques, the noise can be jarring and distracting to a user. In the past, the concept of "calm technology" was introduced as the idea that technology should help and inform a user in a manner that its existence is barely noticed. Such a concept focuses on only capturing a user's attention when necessary. Recent trends in technology design follow this "calm technology" concept in that devices and accompanying notifications are designed to avoid distracting a user while providing features that become a natural part of the user's life. However, traditional methods of scanning a barcode using noise-based notifications fail to successfully follow this "calm technology" concept.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects described herein provide a new way for gently guiding a user's movements associated with a hand-held barcode reader using visual signals. Particularly, sensory soft-feedback (e.g., lights of different colors and sizes) can be provided to a user using light, and in particular, a light-spot. The light-spot can cause a user to move his/her hand, which causes the hand-held barcode reader to move from a current position to a desired new position. The desired new position improves the readability of a barcode by the hand-held barcode reader. A user's hand can then be guided to move the hand-held barcode reader to the desired new position using a determined displacement based on the current position and the desired new position with respect to the barcode on a surface. This displacement can be used to generate and display a light-spot on the surface to guide user positioning of the hand-held barcode reader to the desired new position.

BRIEF DESCRIPTION OF THE DRAWINGS

The present invention is illustrated by way of example and not limitation in the accompanying figures in which like reference numerals indicate similar elements and in which.

DETAILED DESCRIPTION

The subject matter of aspects of the present invention is described with specificity herein to meet statutory requirements. However, the description itself is not intended to limit the scope of this patent.

Embodiments of the present invention can be implemented to softly or gently guide a user's hand, using visual signals, while the user is holding a hand-held barcode reader. Particularly, a light-spot can be generated and displayed at a position on a surface to guide a user in a direction (e.g., x, y, and/or z) at which the hand-held barcode reader can successfully decode a barcode. A barcode, as used herein, includes 1D and 2D optical codes as well as other type or visible indicia, such as a watermark. The position can be determined using a computed displacement between a current position of the hand-held barcode reader and a desired new position of the hand-held barcode reader. The light-spot may have circular shape, a rectangular shape, or other preconfigured shapes.

In a first aspect, a method is provided for guiding a position of a hand-held barcode reader. Information is received about a surface within a field of view of a hand-held barcode reader. Using a decoding module of the hand-held barcode reader, a first barcode at least partially visible within the field of view of the hand-held barcode reader is analyzed. Information about the surface in relation to the first barcode is retrieved from the decoding module. Based on the determined displacement, an LED of the hand-held barcode reader is used to produce a first-colored light-spot at a position on the surface. The first-colored light-spot directs a desired movement of the hand-held barcode reader by way of the user's hand to move the hand-held barcode reader from the current position to the desired new position. In particular, an aimer of the hand-held barcode reader is guided towards the first-colored light-spot at the position on the surface.

In a second aspect, one or more computer storage media storing computer-useable instructions that, when used by one or more computing devices, causes the one or more computing devices to perform operations. Information about a surface within a field of view of a hand-held barcode reader is received. A first barcode at least partially visible within the field of view of the hand-held barcode reader is analyzed. Upon failing to decode the first barcode, a displacement is determined. The displacement comprises at least one of a planar displacement or a surface distance displacement. The displacement is based on a current position of the hand-held barcode reader with respect to the first barcode on the surface in relation to a desired new position of the hand-held barcode reader. An activation pattern based on the displacement is generated. The activation patterned is utilized to product a first-colored light-spot at a position on the surface. The first-colored light-spot has a size corresponding to the surface distance displacement. The position on the surface corresponds to the desired new position of the hand-held barcode reader.

In a third aspect, a hand-held barcode reader is provided. The hand-held barcode reader comprises a decoding module for analyzing barcodes. The hand-held barcode reader comprises a scanner that comprises at least one LED and a sensor. The hand-held barcode reader comprises at least one processor coupled to a memory, where the processor performs various operations. Information from the sensor about a surface within a field of view of the hand-held barcode decide is received. A position based on a current position of the hand-held barcode reader with respect to a first barcode is determined. Based on the position, an activation pattern for the at least one LED of the hand-held barcode reader is produced. The activation pattern is to direct a first-colored light-spot generated by the hand-held barcode reader to a position on the surface. The at least one LED of the hand-held barcode reader generates the first-colored light-spot at the position on the surface. The first-colored light-spot has a size corresponding to a depth distance from the surface. The first-colored light-spot directs a desired movement of the hand-held barcode reader to move from the current position to a desired new position as an aimer of the hand-held barcode reader is guided by the user towards the first-colored light-spot at the position on the surface.

As mentioned, aspects described herein provide gentle or soft feedback to a user using a light-spot that indicates to the user to move the user's hand in such a way that a hand-held barcode reader held by the user is moved from a current position to a desired new position. The desired new position improves the readability of a barcode by the hand-held barcode reader. A user's hand can be guided to the desired new position by projecting a light-spot on a localized barcode candidate or on the proximity of a barcode candidate. The relative position of the barcode candidate with respect to the hand-held barcode reader can be obtained in one of the methods described in literature and will not be detailed in this disclosure. Moreover, a user's hand can be guided to the desired new position by determining a displacement, the displacement, for example, being a distance between the current position and the desired new position, where the desired new position is determined with respect to the barcode on a surface. The computed displacement can then be used to generate a light-spot, or some other visual cue, projected to a position on the surface. Displacement can be based on at least one of a planar displacement, a surface distance displacement, or a combination thereof. Planar displacement corresponds to a planar coordinate shift of the current position of the hand-held barcode reader with respect to a barcode on the surface. Surface distance displacement corresponds to a surface distance shift of the current position of the hand-held barcode reader with respect to a barcode on the surface (e.g., a distance that the user's hand should move toward the surface with the barcode or away from the surface with the barcode).

In an embodiment of the present disclosure, an algorithm can be used to determine the displacement based on a current position of a hand-held barcode reader and a desired new position of the hand-held barcode reader. First, information about a surface within a field of view of a hand-held barcode reader may be received. There are many methods described in literature to analyze a surface for the presence of one or more barcodes, and will not be detailed in this disclosure.

Figure 1A:
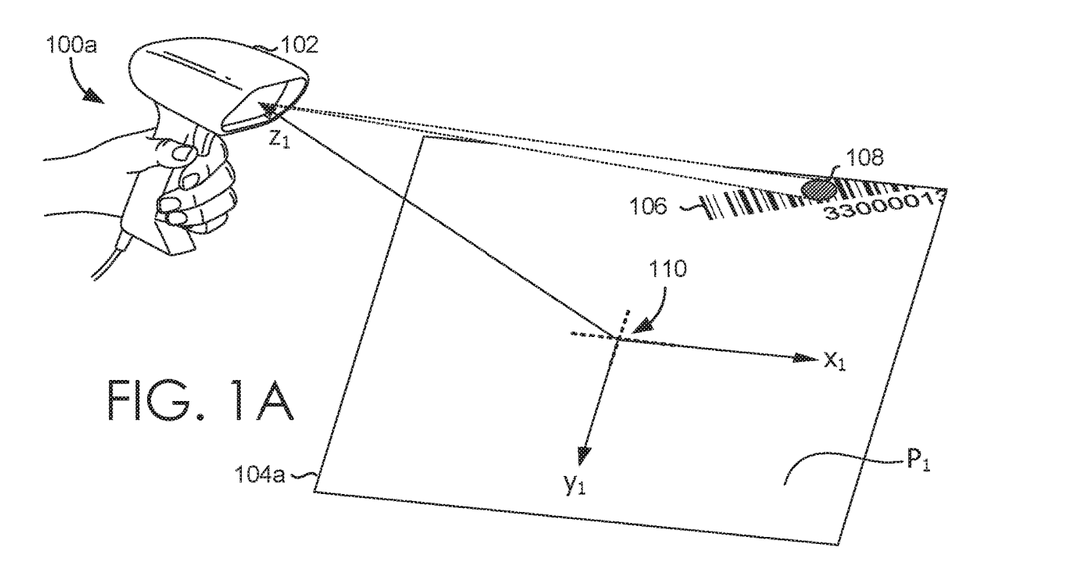
FIG. 1A is an illustration of determining displacement based on a current position of a hand-held barcode reader and a desired new position of the hand-held barcode reader, implemented in accordance with an embodiment of the present invention.
Figure 1B:
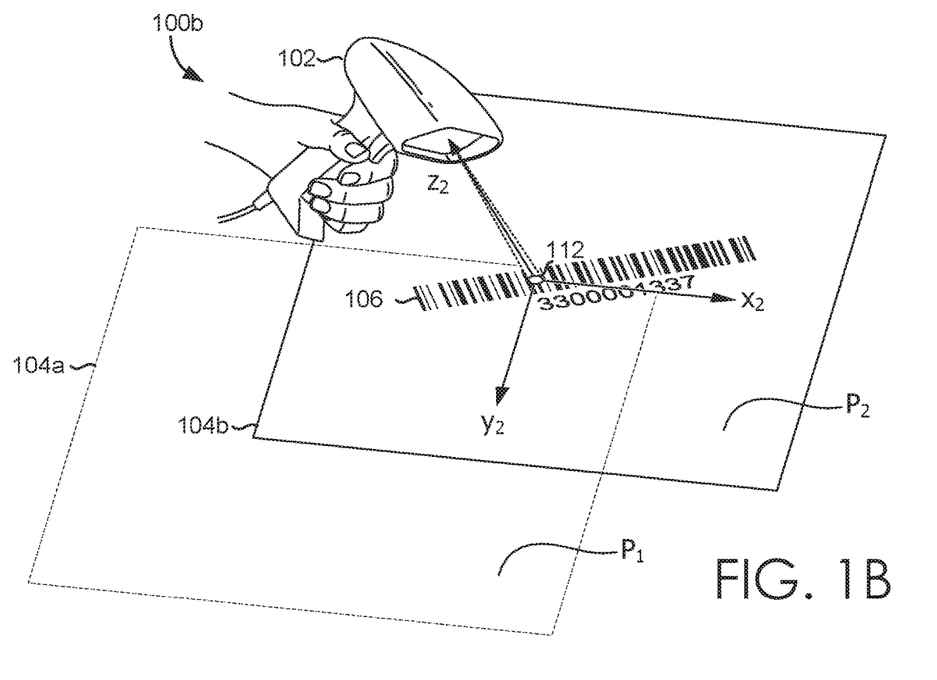
FIG. 1B is an illustration of determining displacement based on a current position of a hand-held barcode reader and a desired new position of the hand-held barcode reader, implemented in accordance with an embodiment of the present invention.

In FIGS. 1A and 1B, a hand-held barcode reader 102 is shown at current position 100a. The hand-held barcode reader has a decoding module that can receive information about the surface within field of view 104a. Barcode 106 is at least partially visible within field of view 104a of hand-held barcode reader 102, and thus can be analyzed to determine whether hand-held barcode reader 102 can decode the barcode 106. When barcode 106 is not decodable by hand-held barcode reader 102, a light-spot can be projected onto barcode 106 or in the proximity of barcode 106 using a relative position between barcode 106 and hand-held barcode reader 102. Aimer 110 of hand-held barcode reader 102 can be used to indicate the current center of field of view 104a. The light-spot can be used to guide the user to move the hand-held barcode reader 102 so that aimer 110 is moved to a field of view (e.g., field of view 104b) where hand-held barcode reader can successfully decode barcode 106. It should be appreciated aimer 110 moves in response to a user's moving hand-held barcode reader 102. In embodiments, the aimer can be generated using a laser pointer. The aimer can have peculiar shape, such as a cross or a square, indicating the center of the field of view. The aimer can be turned off when the field of view is determined to contain the barcode such that the aimer does not appear on the field of view when the barcode is decoded and/or scanned.

In embodiments, a user's hand can be guided from a current position to a desired new position using a determined displacement. A displacement can be based on at least one of a planar displacement or a surface distance displacement or both.

A planar displacement, as used herein, may be based on planar coordinate shift indicating a movement of the hand-held barcode reader from current position 100a to desired new position 100b, illustrated in FIG. 1B. Such a planar coordinate shift may be movement in the planar direction (e.g., x, y) from $x_1$, $y_1$ to $x_2$, $y_2$. This planar coordinate shift can reflect a desired movement of hand-held barcode reader 102 from current position 100a where barcode 106 is only partially visible in field of view 104a to desired new position 100b where barcode 106 is framed at or near the center of field of view 104b as shown in FIG. 1B.

A surface distance displacement can be based on surface distance shift indicating a movement of the hand-held barcode reader from current position 100a to desired new position 100b. Such a surface distance shift can be movement in the depth direction (e.g., z) from $z_1$ to $z_2$. This surface distance shift can reflect a desired movement of hand-held barcode reader 102 from current position 100a where barcode 106 is too close or too far away from hand-held barcode reader 102 to a desired new position 100b where barcode 106 is framed at or near a surface distance from which hand-held barcode reader 102 can decode the barcode.

The displacement can be used to generate light-spot 108 at a position on the surface. The light-spot may illuminate partially visible barcode 106. Light-spot 108 can have attributes that correspond to the displacement such that as a user reacts to the light-spot (e.g., hand movement), hand-held barcode reader 102 is moved from current position 100a to desired new position 100b. In particular, in one aspect shown in FIG. 1A, light-spot 108 is placed at a position near the center of barcode 106. In an embodiment, light-spot 108 can be displayed using a particular color (e.g., orange). This color can provide non-distracting feedback to a user that the current positioning of hand-held barcode reader 102 does not allow for the reader to decode the barcode. In one instance, the position of the light-spot is selected such that a user can react to the light-spot's placement, moving hand-held barcode reader 102 to desired new position 100b by moving the hand-held barcode reader 102 towards light-spot 108. For example, the user may instinctively try to guide aimer 110 of hand-held barcode reader 102 towards light-spot 108. In embodiments, the light-spot 108 can be turned off when a movement of the hand-held barcode reader 102 is detected. This movement may be detected by different means well-known in the art and commonly present with hand-held optical readers, such as gyroscopes or accelerometers. In these embodiments, the user may instinctively try to guide aimer 110 of hand-held barcode reader 102 towards the position where light-spot 108 was projected before the user started to move the hand-held barcode reader 102.

In addition to color, further feedback can be provided to the user by a size of light-spot 108. In particular, in one aspect, the farther the hand-held barcode reader 102 is relative to the surface, the larger the light-spot. This size can provide sensory soft-feedback to a user that the current positioning of hand-held barcode reader 102 does not allow for the reader to decode the barcode.

Upon the user moving hand-held barcode reader 102 in response to light-spot 108, field of view 104a can shift to field of view 104b. Such a shift may not only be in the planar direction, but also in the depth direction such that $P_1$ can be a wider plane and $P_2$ can be a smaller plane. When hand-held barcode reader 102 is at desired new position 100b, light-spot 112 can be generated. In embodiments, light-spot 112 may be a different color than light-spot 108, providing feedback to a user that hand-held barcode reader 102 successfully decoded barcode 106. In one embodiment, the success light-spot 112 may be a green light-spot. This light spot 112 may be centered on decoded barcode 106 or in close proximity to the barcode. Further, additional colors can be used to provide other feedback related to other actions to provide the user with further understanding of the positioning of the hand-held barcode reader. Different colors can be used to provide visual feedback that, for example, a barcode is corrupted, a barcode is out of a scan window, a barcode is too near or too far for the hand-held barcode reader to focus, a barcode does not have enough white space on the sides, the scan light is reflecting on a barcode surface and disturbing the information needed to successfully scan the barcode, etc. Each different issue can be indicated via a designated light color (e.g., a corrupted barcode can be indicated using a red light-spot). Such issues can also be grouped to reduce the number of different colors used (e.g., reading issues with the barcode itself shown using one color, reading issues based on moving the hand-held barcode reader shown using another color, etc.). Colors can be selected in a manner such that they provide useful hints to a user about how to move the hand-held barcode reader to obtain a successful scan of a barcode and/or notify the user that a barcode cannot be successfully scanned (e.g., due to corruption).

Figure 2:
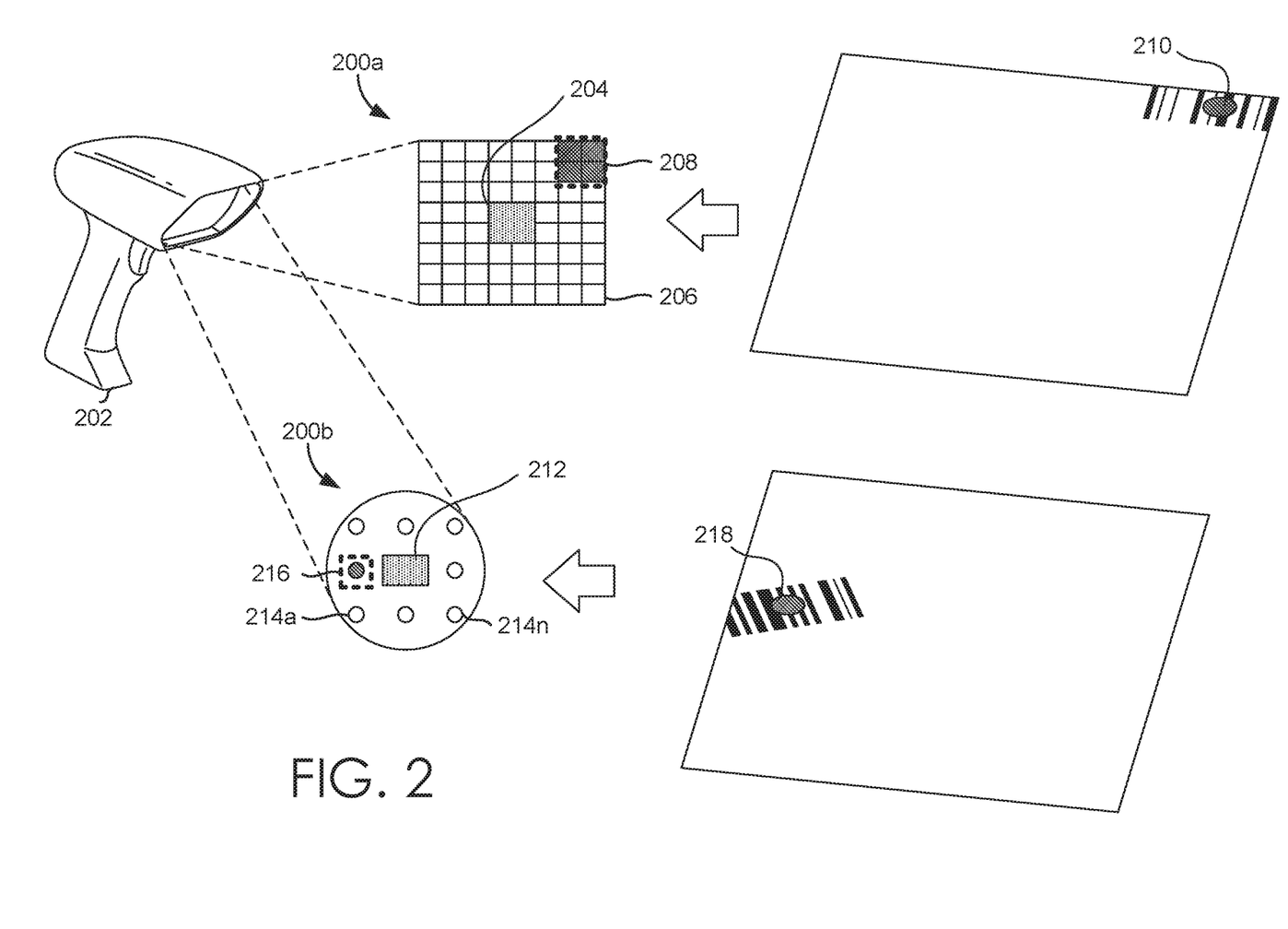
FIG. 2 depicts an illustrative hand-held barcode reader capable of generating light-spots for guiding hand movement, implemented in accordance with an embodiment of the present invention.

Light-spots 108 and 112 can be generated using at least one LED of a hand-held barcode reader, such as hand-held barcode reader 202 in FIG. 2. In this embodiment, hand-held barcode reader 202 can have LEDs that can be activated using an "activation pattern" to produce a light-spot. The activation pattern can be based, for example, on a computed displacement needed to move a hand-held barcode reader from a current position to a desired new position.

Hand-held barcode reader 202 can use various configurations of a LED-based illuminator to generate light-spots. As depicted, configuration 200a can have sensor window 204 and LED bars 206. Configuration 200a can generate light-spot 210 using activation pattern 208 as depicted. Activation pattern 208 can be used to generate light-spot 210 at a position corresponding to the displacement determined to move a hand-held barcode reader from a current position to a desired new position. Activation pattern 208 can also be used to generate light-spot 210 with a size corresponding to the displacement determined to move a hand-held barcode reader from a current position to a desired new position. In particular, activation pattern 208 can correlate with a number and/or pattern of LEDs required to create the correct size for light-spot 210 based on the collimation effect of a light cone generated by the LEDs.

Continuing from the discussion above, configuration 200b can have sensor window 212 and LEDs 214a-214n. Configuration 200b can generate light-spot 218 using activation pattern 216 as depicted. Activation pattern 216 can be used to generate light-spot 218 at a position corresponding to a displacement determined to move a hand-held barcode reader from a current position to a desired new position. Activation pattern 216 can also be used to generate light-spot 218 with a size corresponding to the displacement determined to move a hand-held barcode reader from a current position to a desired new position. In particular, activation pattern 216 can correlate with a number and/or pattern of LEDs required to create the correct size for light-spot 218 based on the collimation effect of a light cone generated by the LEDs.

Figure 3:
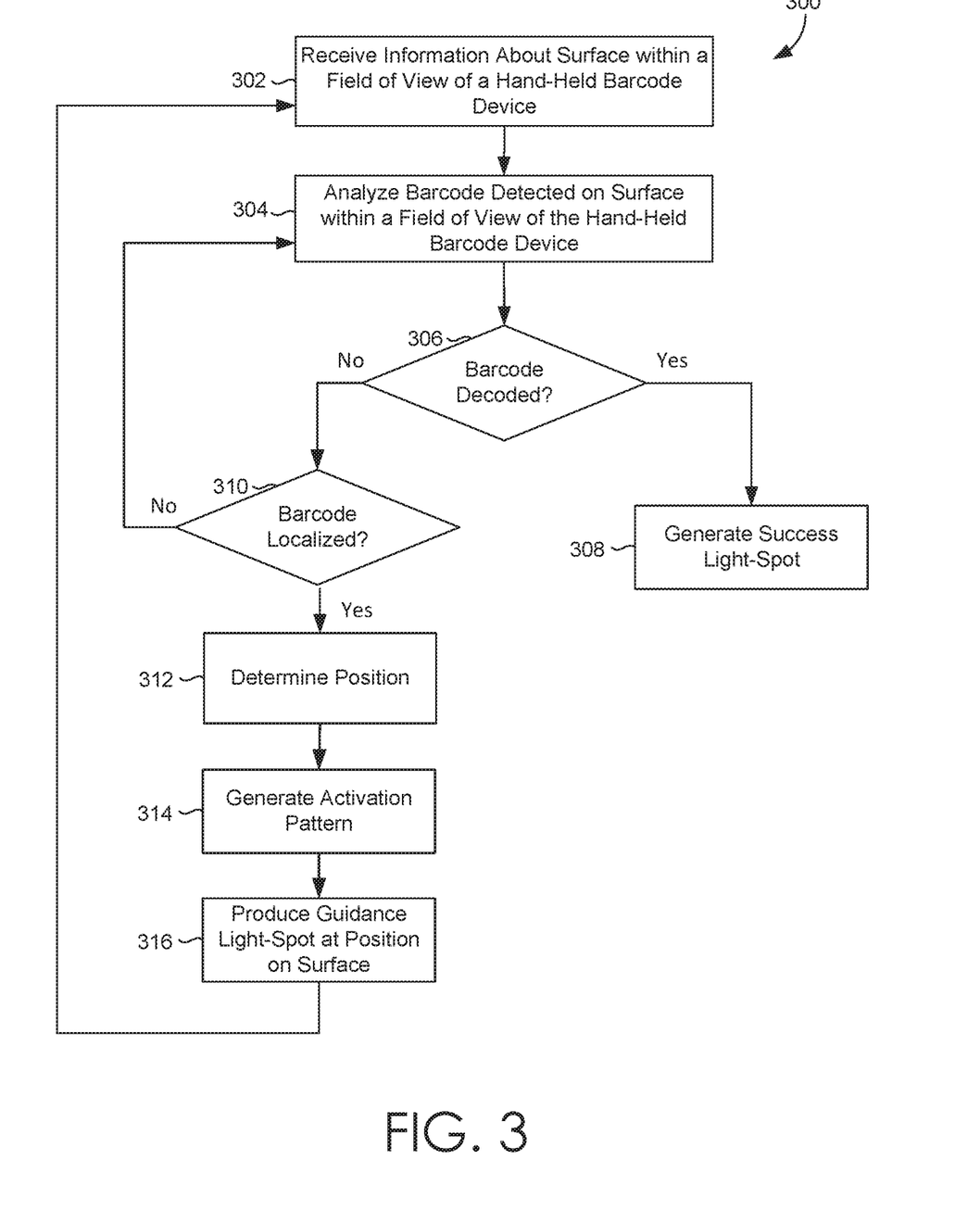
FIG. 3 depicts a method for generating light-spots for guiding hand movement, implemented in accordance with an embodiment of the present invention.

Turning now to FIG. 3, a process for generating light-spots for guiding hand movement is provided in a method 300. In a step 302, information about a surface within a field of view of a hand-held barcode reader can be received. In a step 304, a barcode detected on the surface within the field of view can be analyzed. A determination is made at step 306 whether the barcode was successfully decoded by the hand-held barcode reader. When the determination at step 306 is that the barcode was decoded, the process can continue to step 308 where a success light-spot can be generated. A success light-spot can be based, for example, on DATA-LOGIC'S green spot feature. Moreover, in one embodiment, a success light-spot can be projected directly on a successfully decoded barcode or projected in close proximity to such a barcode.

When the determination at 306 is that the barcode was not decoded, the process can continue to step 310 where a determination is made whether the barcode is localized. A localized barcode is one that can be at least partially visible within a field of view for the hand-held barcode reader. In embodiments, a localized barcode can be at least partially visible within a field of view but not decodable by the hand-held barcode reader. A barcode may be visible but fail to be decoded for various reasons (e.g., at least a portion of the barcode is out of the field of view, the barcode is incomplete, the barcode is defective, etc.). When the barcode is not localized at step 310, in embodiments, the process can return to step 304. When the barcode is localized at step 310, the process can proceed to step 312.

In step 312, a movement can be determined. Movement can be based on the relative position of a barcode in relation to a hand-held barcode reader. This relative position can be used to shift a hand-held barcode reader from a current position, where a barcode is localized but not decodable, to a desired new position where the barcode will be decodable by the hand-held barcode reader. This relative position of the barcode candidate with respect to the hand-held barcode reader can be obtained using any one of a number of methods described in literature and will not be detailed in this disclosure. Upon determining movement, at step 314, an activation pattern can be generated. The activation pattern can be based on the movement determined to move a hand-held barcode reader from a current position to a desired new position. The activation pattern can correlate with a number and/or pattern of LEDs required to generate a light-spot that can provide sensory soft-feedback to a user that the current positioning of the hand-held barcode reader does not allow the reader to decode the barcode. The light-spot can further convey sensory soft-feedback indicating a position and/or size corresponding to a desired new position for the held barcode reader.

At step 316, a guidance light-spot can be produced at a position on the surface. The position can be selected such that a user can react to the position, moving the hand-held barcode reader to a desired new position by moving the hand-held barcode reader towards the guidance light-spot. Such a light-spot can be a particular color (e.g., orange). This color can provide sensory soft-feedback to a user that the current positioning of the hand-held barcode reader does not allow the reader to decode the barcode. Further sensory soft-feedback can be provided by a size of the guidance light-spot. In one embodiment, the higher (e.g., greater distance) the hand-held barcode reader is relative to the surface, the larger the light-spot. This size can provide sensory soft-feedback to a user that the current positioning of hand-held barcode reader does not allow for the reader to decode the barcode. An aimer of the hand-held barcode reader indicating the center of the field of view can be moved towards the guidance light-spot based on the user's movement of the hand-held barcode reader. The aimer may be turned off when the field of view is determined to contain the barcode such that the aimer does not appear on the field of view when the barcode is decoded and/or scanned.

Steps 302-316 can be repeated as necessary if additional barcodes are detected within the field of view by the hand-held barcode reader.

Figure 4:
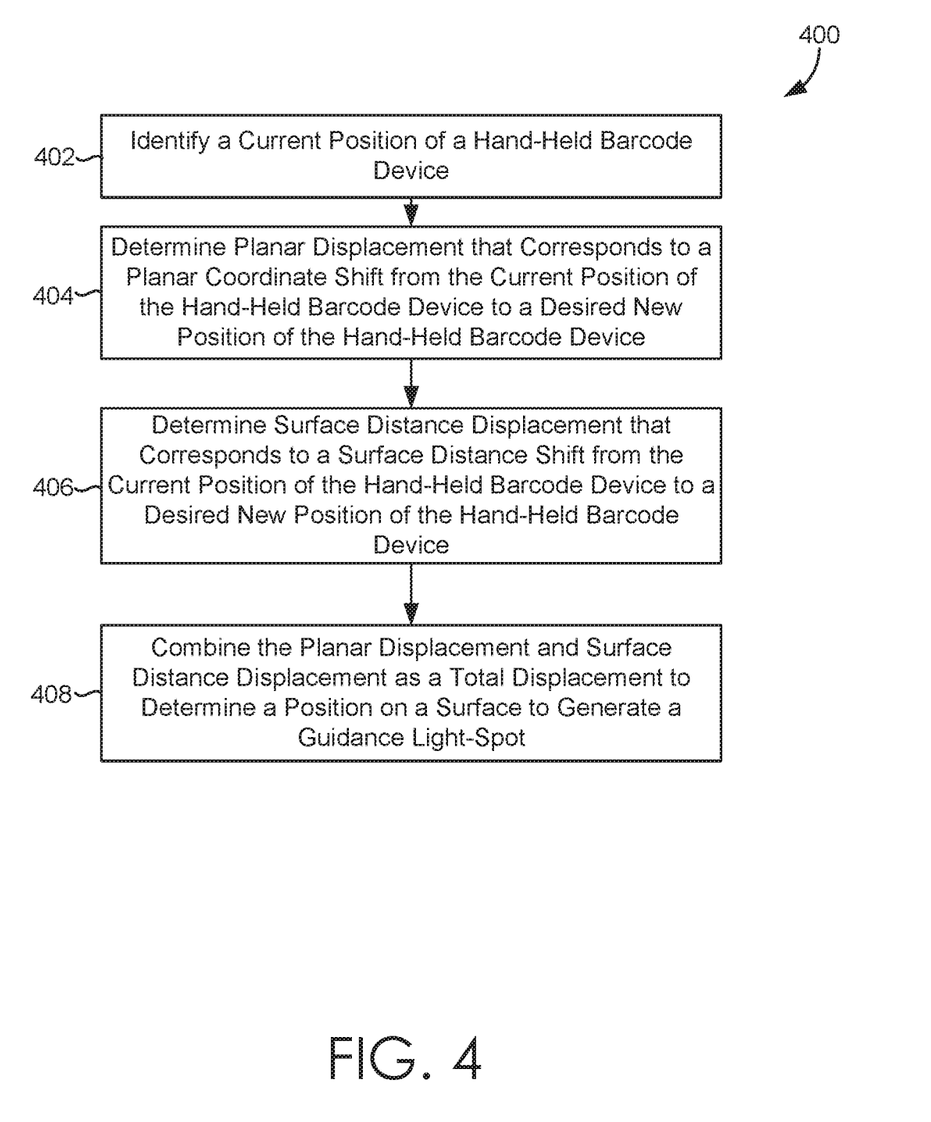
FIG. 4 depicts a method for determining displacement, implemented in accordance with an embodiment of the present invention.

In FIG. 4, a process for determining displacement is provided in a method 400. At step 402, a current position of a hand-held barcode reader can be identified. The current position can be in reference to one or more barcodes on a surface that are detected in a field of view of the hand-held barcode reader.

At step 404, a planar displacement can be determined. In embodiments, a decoding module can be used to determine the planar displacement. The planar displacement can correspond to a planar coordinate shift from the current position of the hand-held barcode reader to a desired new position of the hand-held barcode reader. The desired new position of the hand-held barcode reader can be determined based on a position and/or movement of the hand-held barcode reader determined to improve the readability of one or more barcodes on the surface. In this way, planar displacement can correspond to a planar coordinate shift of the current position of the hand-held barcode reader to the desired new position (e.g., from $x_1$, $y_1$ to $x_2$, $y_2$).

At step 406, a surface distance displacement can be determined. In embodiments, the decoding module can be used to determine the surface distance displacement. The surface distance displacement can correspond to a surface distance shift from the current position of the hand-held barcode reader to a desired new position of the hand-held barcode reader. The desired new position of the hand-held barcode reader can be determined based on a position and/or movement of the hand-held barcode reader determined to improve the readability of one or more barcodes on the surface. In this way, surface distance displacement can correspond to a surface distance shift of the current position of the hand-held barcode reader to the desired new position (e.g., from $z_1$ to $z_2$). The surface distance displacement can be determined by combining an estimated pixel-per-module of a barcode on the surface and information related to a field of view of the hand-held barcode reader. In embodiments, the information related to the field of view can be determined using an "interdiction box" that designates a geometrical area of the surface within the field of view of the hand-held barcode reader. This information can include the geometrical position and length of the interdiction box.

At step 408, the planar displacement and the surface displacement can be combined as a total displacement (e.g., a displacement). The displacement can be used to determine a position on the surface at which to generate a guidance light-spot. It should be appreciated that in embodiments only one of the planar displacement and the surface displacement can be determined for displacement (e.g., the desired new position corresponds to only movement from $z_1$ to $z_2$ but not movement from $x_1$, $y_1$ to $x_2$, $y_2$).

Figure 5A:
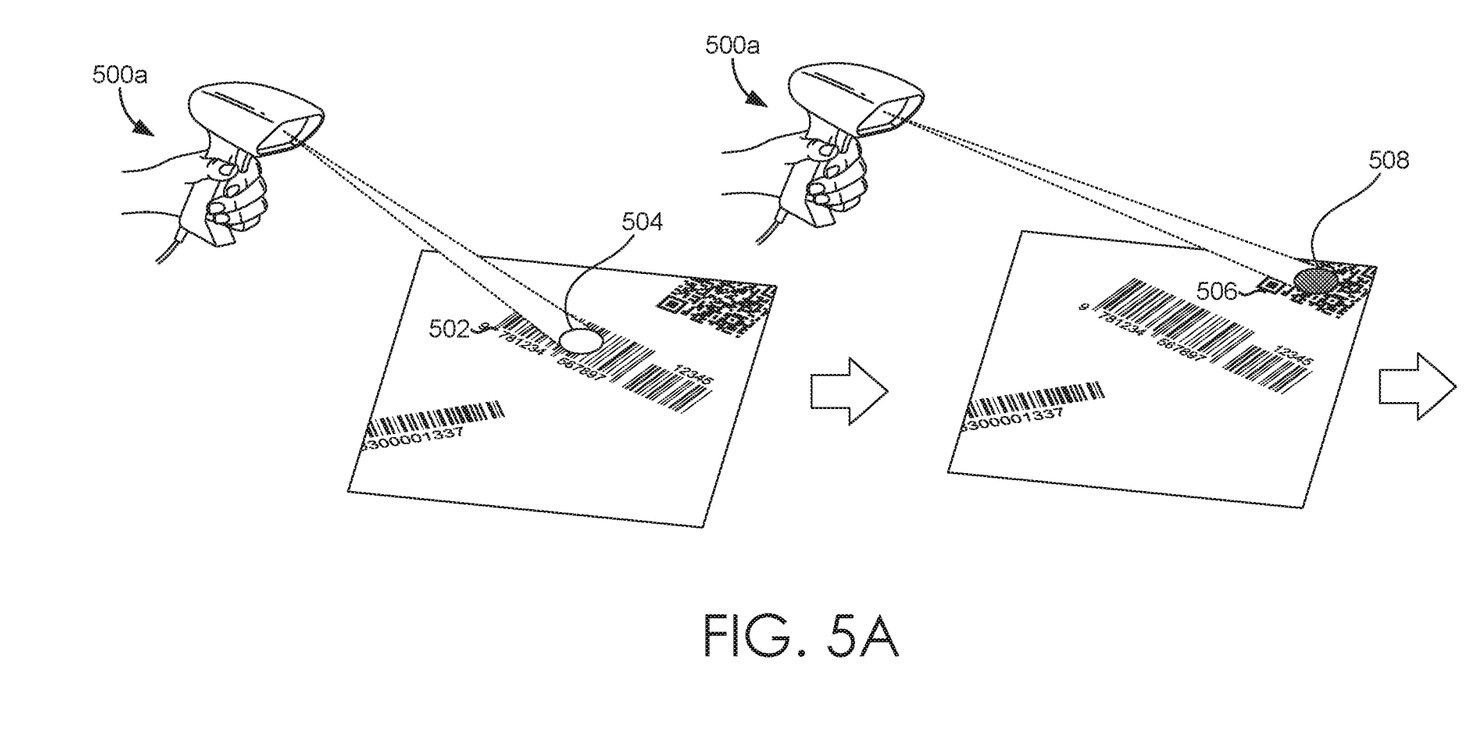
FIG. 5A depicts a scenario in which sensory soft-feedback is provided to decode multiple barcodes on a surface, implemented in accordance with an embodiment of the present invention.
Figure 5B:
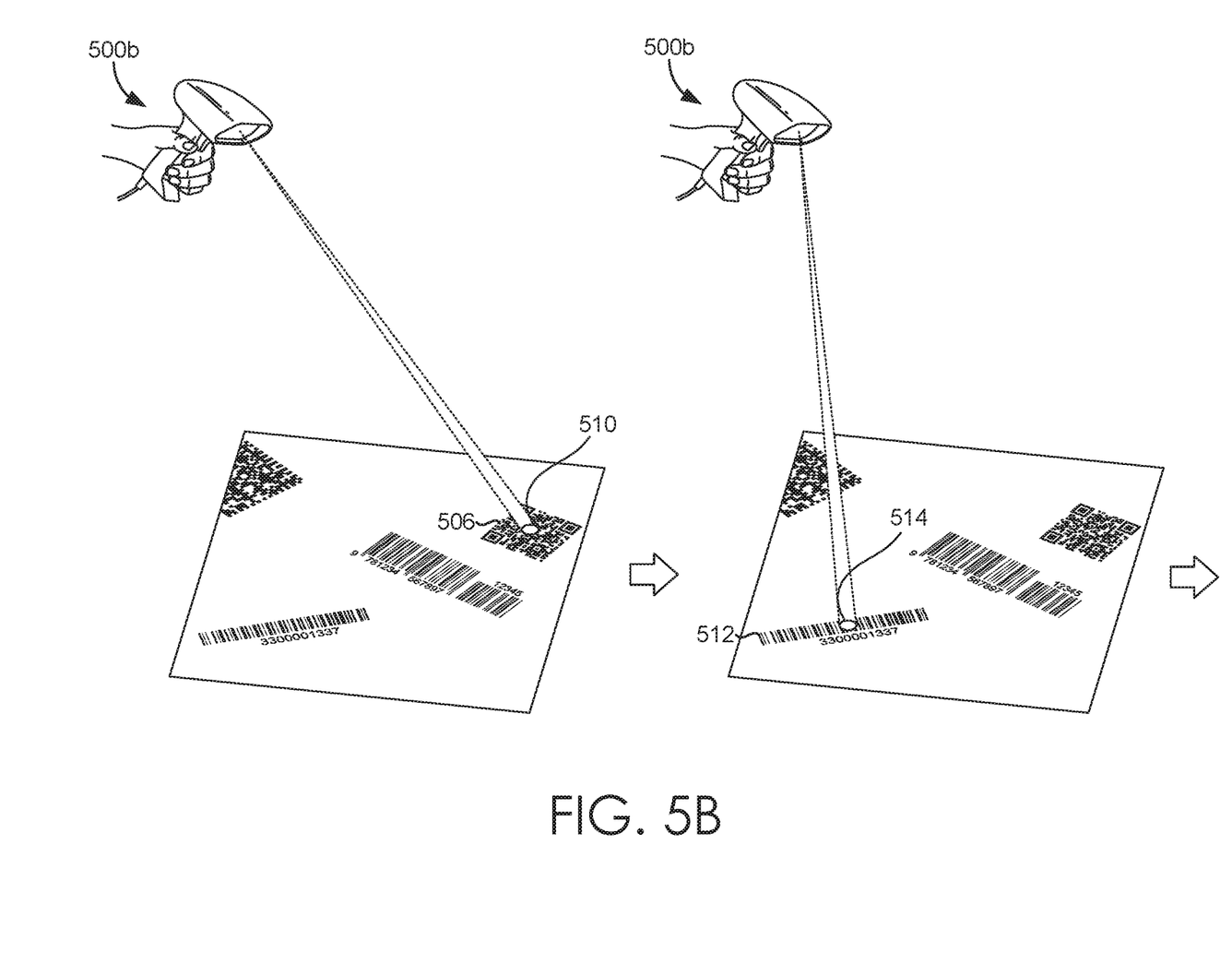
FIG. 5B depicts a scenario in which sensory soft-feedback is provided to decode multiple barcodes on a surface, implemented in accordance with an embodiment of the present invention.
Figure 5C:
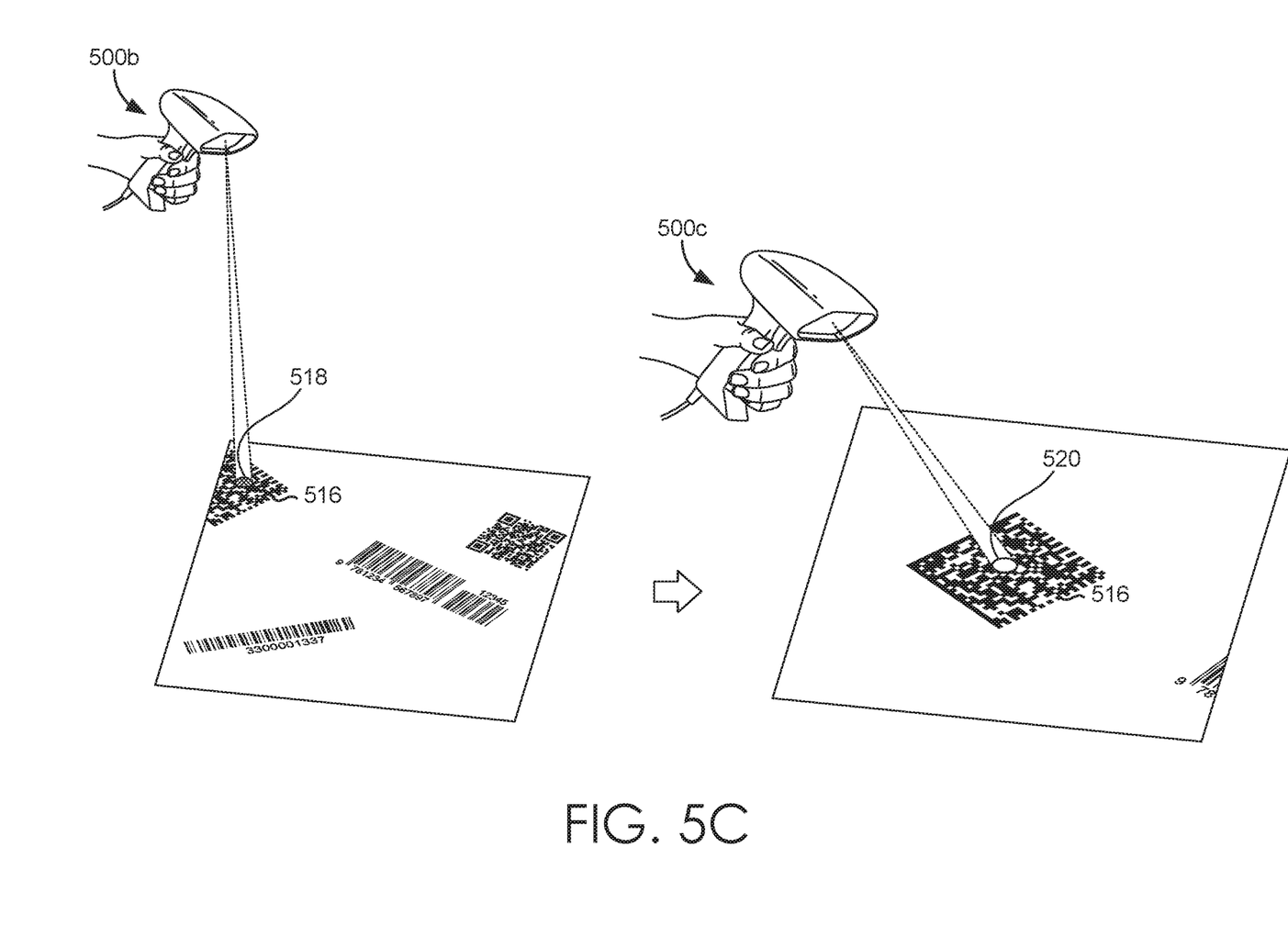
FIG. 5C depicts a scenario in which sensory soft-feedback is provided to decode multiple barcodes on a surface, implemented in accordance with an embodiment of the present invention.

FIGS. 5A-5C depict a scenario in which there are multiple barcodes on a surface. Hand-held barcode reader at position 500a can receive information about a surface within a field of view of the reader. At position 500a, first barcode 502 can be detected. As depicted, first barcode 502 is a mono-dimensional barcode. Because first barcode 502 is determined to be decodable, success light-spot 504 can be generated. Without any movement from position 500a, second barcode 506 can be detected within the field of view of the hand-held barcode reader. Because second barcode 506 cannot be decoded by the hand-held barcode reader, guidance light-spot 508 can be generated. As depicted, second barcode 506 is a two-dimensional QR. Guidance light-spot 508 can cause the user to make a slight adjustment in the position of the hand-held barcode reader to position 500b. As depicted, light-spot 508 may cause the user to move the hand-held barcode reader towards the upper right corner of the field of view in FIG. 5A until the field of view shown in FIG. 5B is reached. In an embodiment, an aimer can be displayed on the surface to help guide the field of view of the hand-held barcode reader towards guidance light-spot 508. Movement of the hand-held barcode reader in response to guidance light-spot 508 results in position 500b of the hand-held barcode reader. Position 500b allows for second barcode 506 to be decoded so that success light-spot 510 can be generated. Without any movement from position 500b, third barcode 512 can be detected within the field of view of the hand-held barcode reader. Because second barcode 506 can be decoded by the hand-held barcode reader, success light-spot 514 can be generated. As depicted, third barcode 512 is a mono-dimensional barcode. Without any movement from position 500b, fourth barcode 516 can be detected within the field of view of the hand-held barcode reader. Because fourth barcode 516 cannot be decoded by the hand-held barcode reader, guidance light-spot 518 can be generated. As depicted, fourth barcode 516 is a two-dimensional Datamatrix. Guidance light-spot 518 can indicate to the user that a slight adjustment in the position of the hand-held barcode reader (to position 500c) is needed to decode the fourth barcode 516. As depicted, this movement can be towards the upper left corner of the field of view 500b until a field of view 500c is reached, as in FIG. 5C.

When multiple barcodes are present in a field of view, a special scan mode may be enabled such that only one barcode is analyzed at a time. In embodiments, all barcodes present in the field of view can be detected and decoded simultaneously. A user can be notified regarding the presence of the multiple barcodes using multiple guidance light-spots. Further, the user can be notified regarding the presence of the multiple barcodes using a single light-spot at a time. A barcode is not scanned until the user releases a reading trigger. A reading trigger for the hand-held barcode reader can be reloaded after successfully decoding a barcode (e.g., after a success light-spot is generated and displayed). If the barcode the user wishes to scan is indicated using a guidance light-spot, the user can follow the motion indicated by the soft sensory-feedback until the barcode is indicated using a success light-spot. Upon a success light-spot being indicated for the barcode, the user can release the reading trigger to scan the barcode. In another embodiment, a barcode is not scanned until the user provides a specific input to the hand-held barcode reader, for example, releases a reading trigger or moves the hand-held barcode reader in a predetermined way. The hand-held barcode reader choices the barcode closer to the aimer when user's input is provided and projects a success light-spot on the barcode chosen or close to it.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

What is claimed is:

1. A method for guiding a position of a hand-held barcode reader, the method comprising:
   receiving information about a surface within a field view of a hand-held barcode reader;
   analyzing, using a decoding module of the hand-held barcode reader, a first barcode at least partially visible within the field of view of the hand-held barcode reader;
   retrieving, from the decoding module, the information about the surface in relation to the first barcode; and
   based on the information about the surface in relation to the first barcode, producing, using an LED of the hand-held barcode reader, a first-colored light-spot at a position on the surface, wherein the first-colored light-spot directs a desired movement of the hand-held barcode reader to move from the current position to a desired new position as an aimer of the hand-held barcode reader is guided towards the position on the surface.

2. The method of claim 1, wherein the desired new position corresponds to a second field of view that frames the first barcode.

3. The method of claim 1, wherein the first-colored light-spot has a size corresponding to the depth distance from the surface.

4. The method of claim 3, wherein the first-colored light-spot has a size corresponding to the depth distance from the surface.

5. The method of claim 1, further comprising:
   further producing one or more additional first-colored light-spots at one or more positions on the surface; and
   receiving a user-based action from a reading trigger, wherein the user-based action results in scanning one or more barcodes corresponding to one of the first-colored light-spots, the first-colored light-spots comprising the first-colored light spot and the one or more additional light-spots.

6. The method of claim 1, further comprising:
   analyzing a second barcode at least partially visible within the field of view of the hand-held barcode reader;
   determining the second barcode is decodable; and
   producing, using the LED of the hand-held barcode reader, a second-colored light spot at a second position on the surface, wherein the second-colored light-spot indicates successful decoding of the second barcode.

7. The method of claim 1, further comprising:
   producing a third-colored light at a third position on the surface, wherein the third-colored light spot indicates a reading issue preventing successful decoding of the first barcode.

8. One or more non-transitory computer storage media storing computer-useable instructions that, when used by one or more computing devices, cause the one or more computing devices to perform operations comprising:
   receiving information about a surface within a field of view of a hand-held barcode reader;
   analyzing a first barcode at least partially visible within the field of view of the hand-held barcode reader;
   determining a displacement that comprises at least one of a planar displacement or a surface distance displacement responsive to failing to decode the first barcode, wherein the displacement is based on a current position of the hand-held barcode reader with respect to the first barcode on the surface in relation to a desired new position of the hand-held barcode reader;
   generating an activation pattern based on the displacement; and
   utilizing the activation pattern to produce a first-colored light-spot at a position on the surface, the first-colored light spot having a size corresponding to the surface distance displacement, wherein the position on the surface corresponds to the desired new position of the hand-held barcode reader.

9. The non-transitory computer storage media of claim 8, wherein the planar displacement corresponds to a planar coordinate shift of the current position of the hand-held barcode reader with respect to the first barcode on the surface.

10. The non-transitory computer storage media of claim 8, wherein the surface distance displacement corresponds to a surface distance shift of the current position of the hand-held barcode reader with respect to the first barcode on the surface.

11. The non-transitory computer storage media of claim 8, further comprising:

analyzing a second barcode at least partially visible within the field of view of the hand-held barcode reader;
determining the second barcode is decodable; and
producing, using the LED of the hand-held barcode reader, a second-colored light spot at a second position on the surface, wherein the second-colored light-spot indicates successful decoding of the second barcode.

12. The non-transitory computer storage media of claim 8, further comprising:
receiving further information about the surface within a second field of view of the hand-held barcode reader, the second field of view corresponding to the desired new position of the hand-held barcode reader;
analyzing the first barcode reader that is at least partially visible within the second field of view of the hand-held barcode reader;
determining the first barcode is decodable; and
producing, using the LED of the hand-held barcode reader, a second-colored light spot at a second position on the surface, wherein the second-colored light-spot indicates successful decoding of the first barcode.

13. The non-transitory computer storage media of claim 8, further comprising:
receiving a user-based action from a reading trigger, wherein the user-based action results in scanning the first barcode.

14. A hand-held barcode reader comprising:
a decoding module for analyzing barcodes;
a scanner comprising at least one LED and a sensor; and
at least one processor coupled to a memory, the at least one processor configured to: receive information from the sensor about a surface within a field of view of the hand-held barcode reader;
determine a position based on a current position of the hand-held barcode reader with respect to a first barcode; and
based on the position, produce an activation pattern for the at least one LED of the hand-held barcode reader to direct a first-colored light-spot generated by the hand-held barcode reader to the position on the surface, wherein the at least one LED of the hand-held barcode reader generates the first-colored light-spot at the position on the surface, the first-colored light-spot having a size corresponding to a depth distance from the surface, wherein the first-colored light-spot directs a desired movement of the hand-held barcode reader to move from the current position to a desired new position as an aimer of the hand-held barcode reader is guided towards the first-colored light-spot at the position on the surface.

15. The hand-held barcode reader of claim 14, wherein the desired new position corresponds to a second field of view that frames the first barcode.

16. The hand-held barcode reader of claim 14, further comprising:
receiving further information from the sensor about the surface within a second field of view of the hand-held barcode reader, the second field of view corresponding to the desired position of the hand-held barcode reader;
analyzing the first barcode at least partially visible within the second field of view of the hand-held barcode reader;
determining the first barcode is decodable; and
producing, using the at least one LED of the hand-held barcode reader, a second-colored light-spot at a second position on the surface, wherein the second-colored light-spot indicates successful decoding of the first barcode.

17. The hand-held barcode reader of claim 14, further comprising:
receiving an indication from a reading trigger, wherein the indication results in scanning the first barcode.

18. The hand-held barcode reader of claim 14, further comprising:
analyzing a second barcode reader;
determining the second barcode is decodable; and
producing, using the at least one LED of the hand-held barcode reader, a second-colored light-spot at a second position on the surface, wherein the second-colored light-spot indicated successful decoding of the second barcode.

19. The hand-held barcode reader of claim 14, further comprising:
analyzing a second barcode at least partially visible within the second field of view of the hand-held barcode reader;
determining a third position responsive to failing to decode the second barcode; and
producing, using the at least one LED of the hand-held barcode reader, another first-colored light-spot at the third position on the surface, the first-colored light-spot having a second size corresponding to a depth distance from the surface.

20. The hand-held barcode reader of claim 14, further comprising:
further producing one or more additional first-colored light-spots at one or more positions on the surface; and
receiving a user-based action from a reading trigger, wherein the user-based action results in scanning one or more barcodes corresponding to one of the first-colored light-spots, the first-colored light-spots comprising the first-colored light spot and the one or more additional light-spots.

* * * * *